(12) United States Patent
Chen et al.

(10) Patent No.: US 7,739,394 B2
(45) Date of Patent: Jun. 15, 2010

(54) BI-LEVEL ADDRESSING FOR INTERNET PROTOCOL BROADBAND ACCESS

(75) Inventors: Weijing Chen, Austin, TX (US); Keith Joseph Allen, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1333 days.

(21) Appl. No.: 10/628,249

(22) Filed: Jul. 29, 2003

(65) Prior Publication Data
US 2005/0027834 A1    Feb. 3, 2005

(51) Int. Cl.
*G06F 15/16* (2006.01)

(52) U.S. Cl. ............... 709/230; 709/222; 709/245; 370/351; 370/464

(58) Field of Classification Search ........ 709/220–222, 709/230, 232, 238, 245, 249; 370/351–356, 370/464, 466–467, 475
See application file for complete search history.

(56) References Cited

U.S. PATENT DOCUMENTS

| | | | |
|---|---|---|---|
| 5,600,644 | A | 2/1997 | Chang et al. |
| 5,633,869 | A | 5/1997 | Burnett et al. |
| 5,737,333 | A | 4/1998 | Civanlar et al. |
| 5,757,796 | A | 5/1998 | Hebb |
| 5,781,529 | A | 7/1998 | Liang et al. |
| 5,809,025 | A | 9/1998 | Timbs |
| 5,828,844 | A | 10/1998 | Civanlar et al. |
| 5,835,710 | A | 11/1998 | Nagani et al. |
| 5,892,763 | A | 4/1999 | Laraqui et al. |
| 5,903,559 | A | 5/1999 | Acharya et al. |
| 5,930,477 | A | 7/1999 | Uchida |
| 5,936,959 | A | 8/1999 | Joffe |
| 5,940,394 | A | 8/1999 | Killian |

(Continued)

FOREIGN PATENT DOCUMENTS

WO    99/29137    6/1999

(Continued)

OTHER PUBLICATIONS

Wan, "ASP Bi-level Addressing & ANS Requirements" (99-0534), dated Sep. 26-Oct. 1, 1999.

(Continued)

*Primary Examiner*—William C Vaughn, Jr.
*Assistant Examiner*—Mohamed Ibrahim
(74) *Attorney, Agent, or Firm*—Greenblum & Bernstein, P.L.C.

(57) ABSTRACT

Data packets of a subscriber are addressed for transmission from an originating device through an IP network to a destination network. A DHCP request, associated with a first subscriber IP address from the IP network, is received from the originating device and routed through the IP network to a destination device in the destination network using an IP network address of the destination device. The destination device forwards the DHCP request to a DHCP server. A DHCP response is received from the DHCP server, through the destination device, including a second subscriber IP address associated with the destination network. The DHCP response is sent through the IP network to the originating device using the first subscriber IP address. The originating device obtains the second subscriber IP address from the DHCP response and addresses data packets using the first and second subscriber IP addresses.

26 Claims, 5 Drawing Sheets

U.S. PATENT DOCUMENTS

| | | | |
|---|---|---|---|
| 5,940,396 | A | 8/1999 | Rochberger |
| 5,946,313 | A | 8/1999 | Allan et al. |
| 5,949,782 | A | 9/1999 | Wells |
| 5,958,018 | A | 9/1999 | Eng et al. |
| 5,983,332 | A | 11/1999 | Watkins |
| 5,991,854 | A | 11/1999 | Watkins |
| 6,016,319 | A | 1/2000 | Kshirsagar et al. |
| 6,021,263 | A | 2/2000 | Kujoory et al. |
| 6,034,958 | A | 3/2000 | Wicklung |
| 6,078,586 | A | 6/2000 | Dugan et al. |
| 6,081,836 | A | 6/2000 | Karapetkov et al. |
| 6,111,881 | A | 8/2000 | Soncodi |
| 6,122,670 | A | 9/2000 | Bennett et al. |
| 6,138,144 | A | 10/2000 | DeSimone et al. |
| 6,195,364 | B1 | 2/2001 | Brodigan |
| 6,222,842 | B1 | 4/2001 | Sasyan et al. |
| 6,252,857 | B1 | 6/2001 | Fendick et al. |
| 6,314,098 | B1 | 11/2001 | Masuda et al. |
| 6,343,322 | B2 | 1/2002 | Nagami et al. |
| 6,343,326 | B2 | 1/2002 | Acharya et al. |
| 6,345,051 | B1 | 2/2002 | Gupta et al. |
| 6,385,170 | B1 | 5/2002 | Chiu et al. |
| 6,456,962 | B1 | 9/2002 | Allingham et al. |
| 6,470,389 | B1 | 10/2002 | Chung et al. |
| 6,496,479 | B1 | 12/2002 | Shionozaki |
| 6,516,417 | B1 | 2/2003 | Pegrum et al. |
| 6,523,068 | B1 | 2/2003 | Beser et al. |
| 6,538,416 | B1 | 3/2003 | Hahne et al. |
| 6,563,794 | B1 | 5/2003 | Takashima et al. |
| 6,598,080 | B1 | 7/2003 | Nagami et al. |
| 6,625,124 | B1 | 9/2003 | Fan et al. |
| 6,697,354 | B1 * | 2/2004 | Borella et al. ............... 370/352 |
| 6,731,642 | B1 * | 5/2004 | Borella et al. ............... 370/401 |
| 6,751,218 | B1 | 6/2004 | Hagirahim et al. |
| 6,798,782 | B1 | 9/2004 | Caronni et al. |
| 6,847,649 | B2 * | 1/2005 | Sutanto ...................... 370/401 |
| 6,850,484 | B1 * | 2/2005 | Greenspan et al. .......... 370/218 |
| 6,952,428 | B1 * | 10/2005 | Necka et al. ................. 370/466 |
| 7,020,720 | B1 * | 3/2006 | Donahue et al. ............ 709/245 |
| 7,099,944 | B1 * | 8/2006 | Anschutz et al. ............ 709/227 |
| 7,277,453 | B2 * | 10/2007 | Chin et al. .................. 370/466 |
| 2002/0038419 | A1 | 3/2002 | Garrett et al. |
| 2002/0061011 | A1 | 5/2002 | Wan |
| 2002/0141369 | A1 | 10/2002 | Perras |
| 2002/0196793 | A1 | 12/2002 | Samba et al. |
| 2003/0028671 | A1 | 2/2003 | Mehta et al. |
| 2003/0076854 | A1 | 4/2003 | Mudhar et al. |
| 2003/0088696 | A1 | 5/2003 | McCanne |
| 2003/0185236 | A1 * | 10/2003 | Asano et al. ................. 370/469 |
| 2004/0042446 | A1 * | 3/2004 | Koch et al. .................. 370/352 |

FOREIGN PATENT DOCUMENTS

| | | |
|---|---|---|
| WO | 00/57296 | 9/2000 |
| WO | 0076122 | 12/2000 |
| WO | 01/11837 | 2/2001 |
| WO | 01/31829 | 5/2001 |

OTHER PUBLICATIONS

Wan, "ASP Bi-level Addressing Architecture" (99-0649), dated Nov. 28-Dec. 4, 1999.
ATM Forum Addressing: Reference Guide (AF-RA-0106.000), The ATM Forum Technical Committee, dated Feb. 1999.
"ATM Forum Addressing: User Guide version 1.0" (AF-RA-0105.000), The ATM Forum Technical Committee, dated Jan. 1999.
"PNNI Transported Address Stack version 1.0" (AF-CS-0115.000), The ATM Forum Technical Committee, dated May 1999.
"New Capabilities ATM Addressing Document (Draft)" (BTD-RA-ADDR-02.03), The ATM Forum Technical Committee, dated Oct. 1998.
"ATM Name System V2.0 Baseline Text" (BTD-SAA-ANS-02.01), The ATM Forum Technical Committee, dated Jul. 1999.
"ATM Bi-Level Addressing Document, Version 1.0" (STR-RA-ADDR-01.00), The ATM Forum Technical Committee, dated Jul. 2000.
"ATM Bi-Level Addressing Document, Version 1.0 (Draft)" (STR-RA-ADDR-01.00), The ATM Forum Technical Committee, dated Jul. 2000.
Specification for RFC 1034, entitled: "Domain Names-Concepts and Facilities", Nov. 1987.
Specification for RFC 1035, entitled: "Domain Names-Implementation and Specification", Nov. 1987.
Specification for RFC 1995, entitled: "Incremental Zone Transfer in DNS" Aug. 1996.
Specification for RFC 1996, entitled: "A Mechanism for Prompt Notification of Zone Changes (DNS NOTIFY)," Aug. 1996.
Specification for RFC 2065, entitled: "Domain Name System Security Extensions" Jan. 1997.
Specification for RFC 2136, entitled: "Dynamic Updates in the Domain Name System (DNS UPDATE)," Apr. 1997.
Specification for RFC 2137, entitled: "Secure Domain Name System Dynamic Update", Apr. 1997.
"The Internet Multimedia Conferencing Architecture", by Handley et al., INET '96, Jun. 1996, pp. 1-13, http://www.isoc.org/inet96/proceedings/.>.
"RSVP-ATM QoS Interworking", Cisco IOS Release 12.0 (3), 2001, pp. 1-34.
"RSVP Over ATM Implementation Requirements", by Berger, FORE Systems, Aug. 1998, ftp://ftp.isi.edu/in-notes/rfc2380.txt.
"An Overview of ATM", <http://www.rware.demon.co.uk/atm.htm>, 1999.
"QoS Trials on SuperJANET in the Context of HICID and Other BT/JISC Project", by Crowcroft et al., Nov. 14, 1997, http://www.cs.ucl.ac.uk/research/hicid/jisc-anc.html.
"Extensions to RSVP for QoS IP Over Signaled QoS Network", by Chen et al., SBC Communications, Inc., Apr. 2002, <http://www.ietf.org/internt-drafts/draft-weijing-rsvp-sqn-00.tex>.
"Resource Reservation Protocol", Cisco Systems, Inc., published on Feb. 20, 2002, http://www.cisco.com/univercd/cc/td/doc/cisintwk/ito_doc/rsvp.htm>.
K. Allen et al., "Ipv6 for Large Access Providers" (Oct. 2002).

* cited by examiner

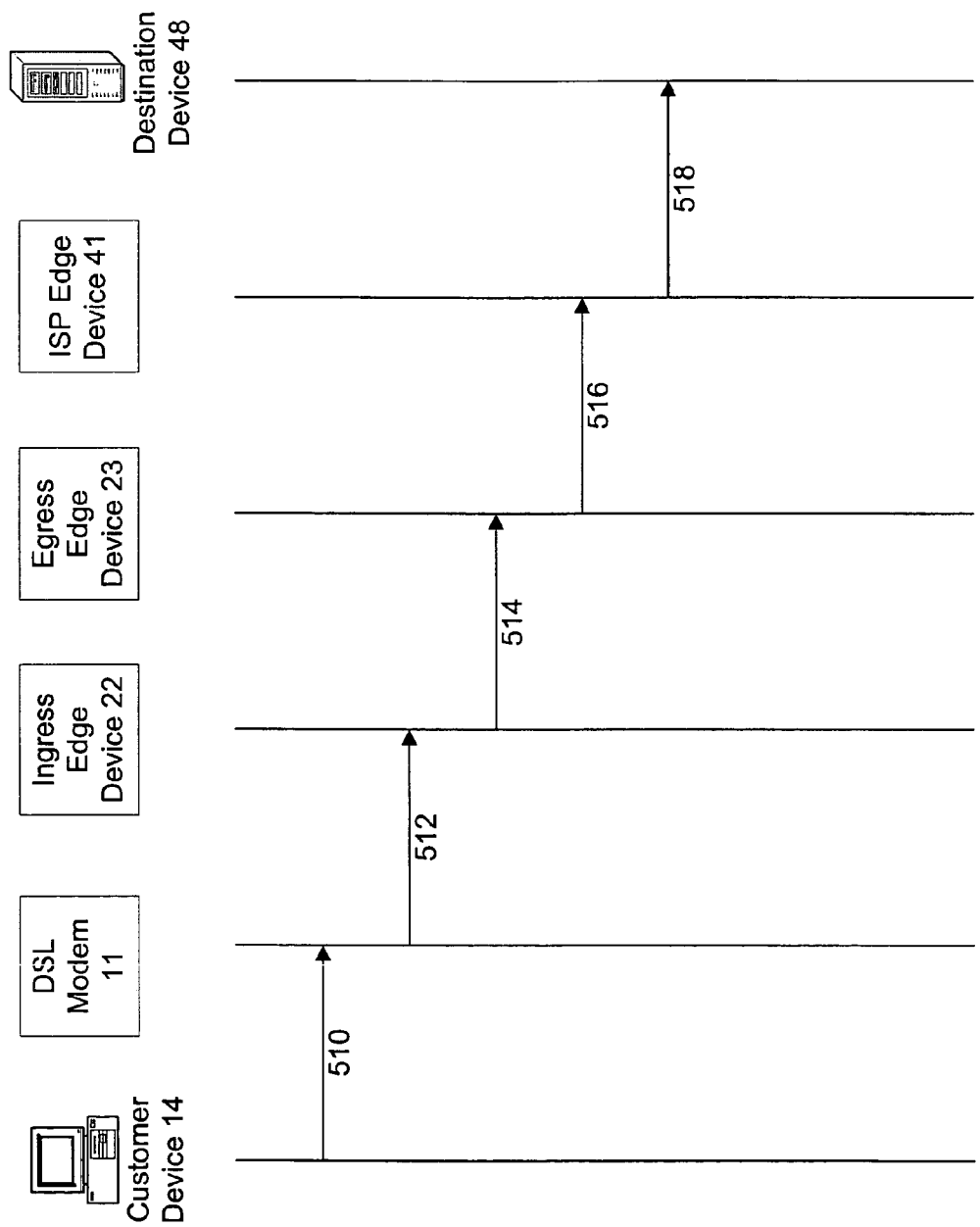

BI-LEVEL ADDRESSING FOR INTERNET PROTOCOL BROADBAND ACCESS

BACKGROUND OF THE INVENTION

1. Field of the Invention

The present invention relates to the field of telecommunications. More particularly, the present invention relates to bi-level addressing of data packets routed through a broadband access link and an Internet protocol network of a telecommunications service provider.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Asynchronous Transfer Mode (ATM)
Broadband Remote Access Server (BRAS)
Digital Subscriber Line (DSL)
Digital Subscriber Line Access Multiplexer (DSLAM)
Domain Naming System (DNS)
Dynamic Host Configuration Protocol (DHCP)
Internet Protocol (IP)
Internet Protocol Version 4 (IPv4)
Internet Protocol Version 6 (IPv6)
Internet Service Provider (ISP)
Point-to-Point Protocol (PPP)
Personal Digital Assistant (PDA)
Public Switched Telephone Network (PSTN)
Request for Comment (RFC)
Telecommunications Service Provider (TSP)
Transmission Control Protocol/Internet Protocol (TCP/IP)
User Datagram Protocol/Internet Protocol (UDP/IP)

3. Background and Material Information

Telecommunications service providers (TSPs) face increasing demand on their networks to provide access to Internet service provider (ISP) or other remote IP networks, such as corporate and private networks and intranets, application service provider networks, and the like, for mass-market subscribers. Currently, many TSPs use asynchronous transfer mode (ATM) connections and point-to-point protocol (PPP) to provide subscribers access to the TSP networks. Increasing quality of service necessarily involves increased ATM connections or PPP sessions, which increases operational expense and slows new service activations.

Also, each ISP or other IP network service provider typically maintains an IP address block to assign unique IP addresses to the various subscribers. Likewise, the TSP providing access to the IP network typically assigns IP addresses to the subscribers from a dedicated TSP address block, as well as to each ISP or other IP network. Alternatively, the TSP network assigns IP addresses to the subscribers on behalf of the ISP or other IP network, which requires the TSP network to maintain multiple, separate logical networks.

Accommodating the enormous number of IP addresses and routing requirements of the associated subscriber data can overwhelm the TSP's ability to provision and maintain connections. The TSP is therefore limited in the number of mass-market subscribers for which it is able to provide access to IP networks, especially with respect to broadband access. The present invention overcomes this problem associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 5 is a call flow diagram illustrating an exemplary transmission of IPv4 or IPv6 data packets through the TSP network, according to an aspect of the present invention.

DETAILED DESCRIPTION OF EMBODIMENTS

Figure 1:
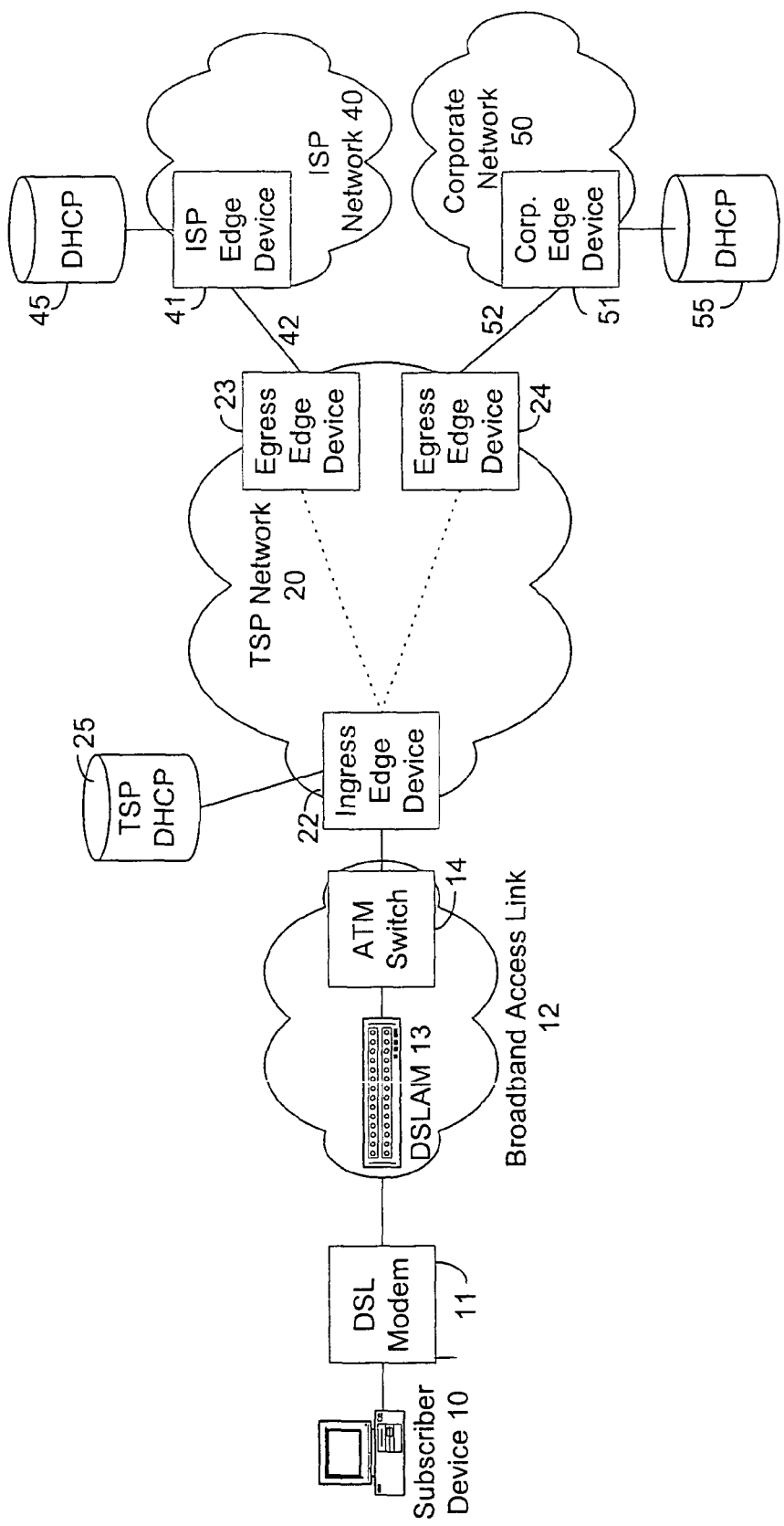
FIG. 1 is a diagram showing an exemplary network architecture, according to an aspect of the present invention.

The present invention relates to an IPv6 based bi-level addressing technique that provides support for Internet and IP broadband access to broadband networks available to mass-market subscribers, such as ISP networks, corporate and private networks, intranets, application service provider networks and the like. The present invention is scalable for large numbers of subscribers and enables the subscribers to control routing of their IP traffic.

More particularly, two IP addresses are assigned to each subscriber device configured to access the TSP network over a broadband access link. The first IP address is assigned from a TSP address block and the second IP address is assigned from an address block of the ISP or other remote IP network. The subscriber's device initially acquires the first IP address from the TSP IP address block automatically and, in an embodiment of the invention, other IP configuration information, such as domain naming system (DNS) data. The subscriber then selects the desired ISP network (or other IP network), provides authentication, and receives the second IP address from the ISP address block. Mapping between the first and second IP addresses is cached to enable transmission of data packets to and from the subscriber device.

In view of the above, the present invention through one or more of its various aspects and/or embodiments is presented to accomplish one or more objectives and advantages, such as those noted below.

An aspect of the present invention provides a method for routing data packets from a subscriber device, over a broadband access link, through a first (IPv6) network to a second IP network, which interface through a second IP network edge device. The method includes providing first and second IP addresses, respectively associated with the first and second IP networks, to the subscriber device. The second IP address is provided based on a request routed through the first IP network from the subscriber device. Data packets from the subscriber's device are addressed with the first IP address and the second IP address. The request includes a dynamic host configuration protocol (DHCP) request. When the subscriber device is an IPv4 device, the method further includes encapsulating the DHCP request in an IPv6 packet for routing the DHCP request through the first IP network.

When the subscriber device is an IPv6 device, the method further includes modifying the DHCP request to include a two-hop IPv6 routing header for routing the DHCP request through the first IP network. The two-hop IPv6 routing header includes an IP address of the edge device as a first hop address and an IP broadcast address of the DHCP request as a second hop address. The IP address of the edge device is associated with the first IP network. The second IP address is provided to the subscriber device based on a DHCP response routed through the first IP network from the edge device to the subscriber device. The DHCP response is modified to include a two-hop IPv6 routing header for routing the DHCP response through the first IP network to the subscriber device. The two-hop IPv6 routing header of the DHCP response includes the first IP address of the subscriber device as a first hop address and the second IP address of the subscriber devices as a second hop address.

Another aspect of the present invention provides a method for addressing data packets of a subscriber for transmission from an originating device over a broadband access link through an IP network to a destination network. The method includes allocating a first subscriber IP address associated with the IP network to the originating device. A DHCP request is received from the originating device, the DHCP request being associated within the first subscriber IP address. The DHCP request is sent through the IP network to a destination device in the destination network using an IP network address of the destination device. The destination device forwards the DHCP request to a DHCP server. A DHCP response is received from the DHCP server, through the destination device. The DHCP response includes a second subscriber IP address from the DHCP server, which is associated with the destination network. The DHCP response is sent through the IP network to the originating device using the first subscriber IP address, enabling the originating device to obtain the second subscriber IP address. Subsequent data packets are addressed using the first subscriber IP address and the second subscriber IP address. When the IP network is an IPv6 network, the first subscriber IP address and the IP network address of the destination device are IPv6 addresses.

When the originating device is an IPv4 device, the DHCP request is a DHCPv4 request, the DHCP response is a DHCPv4 response and the second subscriber IP address is an IPv4 address. Accordingly, sending the DHCP request through the IP network includes encapsulating the DHCPv4 request in a first IPv6 packet, which includes the IPv6 network address of the destination device as a first destination address, and sending the first IPv6 packet to the destination device using the first destination address. The destination device extracts the DHCPv4 request from the first IPv6 packet prior to forwarding the DHCPv4 request to the DHCP server. Sending the DHCP response through the IP network includes encapsulating the DHCPv4 response in a second IPv6 packet, including the first subscriber IPv6 address as a second destination address, and sending the second IPv6 packet to the originating device using the second destination address. The originating device extracts the DHCPv4 response from the second IPv6 packet to obtain the second subscriber IPv4 address.

When the originating device is an IPv6 device, the DHCP request is a DHCPv6 request, the DHCP response is a DHCPv6 response and the second subscriber IP address is an IPv6 address. Accordingly, sending the DHCP request through the IP network includes modifying the DHCPv6 request to include a two-hop IPv6 routing header, which includes the IPv6 network address of the destination device as a first hop address and an IPv6 broadcast address of the DHCPv6 request as the second hop address, and sending the DHCPv6 request to the destination device using the first hop address. Sending the DHCP response through the IP network includes modifying the DHCPv6 response to include a two-hop IPv6 routing header, which includes the first subscriber IPv6 address as a first hop address and the second subscriber IPv6 address of the DHCPv6 request as the second hop address, and sending the DHCPv6 response to the destination device using the first hop address.

Allocating the first subscriber IP address may include matching a previously allocated network IPv6 address of the subscriber. Also, allocating the first subscriber IP address may include receiving an initial DHCP request at a DHCP server associated with the IP network, and sending an initial DHCP response to the originating device from the IP network DHCP server. The initial DHCP response including the first subscriber IP address.

Yet another aspect of the present invention provides a system for addressing data packets of a subscriber for transmission over a broadband access link from an originating device through a first IP network to a second IP network, which interface through at least one edge device of the second IP network. The system includes a first DHCP server in the first IP network, which that allocates a first subscriber IP address to the originating device. The first subscriber IP address is associated with the first IP network. The system further includes a second DHCP server in the second IP network, which receives a DHCP request from the originating device through the at least one edge device, allocates a second subscriber IP address to the originating device, and sends a DHCP response having the second subscriber IP address through the edge device to the originating device. The second subscriber IP address is associated with the second IP network. The originating device addresses data packets using the first subscriber IP address and the second subscriber IP address. The first IP network may be an IPv6 network and the first subscriber IP address may be an IPv6 address.

When the originating device is an IPv4 device, the second DHCP server is a DHCPv4 server, the DHCP request is a DHCPv4 request, the DHCP response is a DHCPv4 response and the second subscriber IP is address is an IPv4 address. The DHCP request from the origination device is encapsulated in a first IPv6 packet, received by the edge device based on an IPv6 address of the edge device included in the first IPv6 packet. The edge device extracts the DHCP request from the first IPv6 packet prior to forwarding the DHCP request to the second DHCP server. The DHCP response from the second DHCP server is encapsulated in a second IPv6 packet, received by the originating device based on the first subscriber IP address included in the second IPv6 packet. The originating device extracts the DHCP response from the second IPv6 packet to obtain the second subscriber IP address.

When the originating device is an IPv6 device, the second DHCP server is a DHCPv6 server, the DHCP request is a DHCPv6 request, the DHCP response is a DHCPv6 response and the second subscriber IP address is an IPv6 address. The DHCPv6 request from the origination device is modified to include a two-hop IPv6 routing header, including an IPv6 network address of the edge device as a first hop address and an IPv6 broadcast address of the DHCPv6 request as a second hop address. The edge device receives the DHCPv6 request based on the first hop address. The DHCPv6 response from the second DHCP server is modified to include a two-hop IPv6 routing header, including the first subscriber IPv6 address as a first hop address and the second subscriber IPv6 address as a second hop address. The edge device directs the DHCPv6 response to the originating device using the first hop address. The second IP network may include, for example, an Internet service provider network or a private network.

The various aspects and embodiments of the present invention are described in detail below.

FIG. 1 is a diagram depicting an exemplary network architecture supporting the present invention. FIG. 1, in particular, depicts a subscriber device 10, which is any device capable of packet switched data communications with an IP network, including, for example, a personal computer, a laptop computer, a personal digital assistant (PDA), a voice over IP telephone or the like. According to alternative embodiments of the present invention, the subscriber device 10 is an IPv4 or an IPv6 device. When the subscriber device 10 is IPv4, it also includes an IPv6 protocol stack so that the subscriber device 10 is a dual stack device.

The subscriber device 10 communicates with an ISP network 40, or other remote IP network, such as a corporate network 50, through an IPv6 TSP core network 20. The subscriber device 10 accesses the TSP network 20 through a subscriber edge device 11 and broadband access link 12, depicted in FIG. 1 as a digital subscriber line (DSL) link. However, in alternative embodiments of the invention, the broadband access link 12 includes any compatible type of broadband access link, such as digital cable, T-1, digital signal-level 3 (DS-3), or optical carrier-level 3 (OC-3) interfaces, or Ethernet, without departing from the spirit and scope of the present invention. In the depicted embodiment of the invention, the subscriber edge device 11 is a DSL modem, and the broadband access link 12 includes a DSL access multiplexer (DSLAM) 13 and an ATM edge switch 14.

The TSP network 20 includes multiple intelligent edge devices, such as IPv6 routers, broadband remote access servers (BRASs) or switches with IPv6 routing functionality. Each edge device 22, 23 and 24 has multiple line interfaces, which correspond to the various subscribers. The multiple line interfaces enable each edge device to simultaneously service multiple subscriber devices, networks or other systems. Typically, a subscriber device 10 corresponds to a single line interface, although alternative embodiments of the invention include multiple interfaces for a single subscriber device 10, or a single line interface for multiple subscriber devices 10.

The TSP network 20 likewise includes a number of IPv6 core routers (not pictured) or other core devices providing IPv6 functionality. The large address space of IPv6 enables static allocation of IPv6 addresses to uniquely identify the subscribers. In other words, each subscriber is able to have a permanent (or semi-permanent), unique IPv6 address over a predetermined period of time. The TSP network 20 routes packets in accordance with any known Internet protocol, including, for example, transmission control protocol/Internet protocol (TCP/IP) and user datagram protocol/Internet protocol (UDP/IP).

The exemplary network infrastructure of FIG. 1 includes a TSP network gateway or ingress edge device 22, which interfaces with the broadband access link 12 of the subscriber device 10. In addition to the ingress edge device 22, FIG. 1 further depicts two egress edge devices 23 and 24. Egress edge device 23 interfaces with the broadband access link 42 of the ISP network 40 and the egress edge device 24 interfaces with the broadband access link 52 of the corporate network 50. In an embodiment of the invention, the ingress edge device 22 and the egress edge devices 23 and 24 are IPv6 routers, such as Cisco 7500 Series Routers by Cisco Systems or Passport 2430 or 5430 Enterprise Routers by Nortel Networks, although any type of IP router capable of being programmed with IPv6 functionality may be used without departing from the spirit and scope of the present invention.

Each of the depicted destination networks, i.e., the ISP network 40 and corporate network 50, have corresponding gateways or edge devices 41 and 51, respectively. The edge devices 41 and 51 may include IPv6 routers and BRASs, as in the TSP network 20. Alternatively, the edge devices 41 and 51 may include IPv4 routers. Similar to the subscriber device 10, when the edge device of a destination network is an IPv4 router, it also includes an IPv6 protocol stack. Regardless of whether the destination edge device is an IPv6 or IPv4 device, the IPv6 packets are routed through the TSP network 20 to one of the egress edge devices 23 or 24, depending on the destination address of the IPv6 packet sent from the ingress edge device 22. For example, a data packet destined for the ISP network 40 is routed from the ingress edge device 22 to the egress edge device 23, passing through core devices within the TSP network 20, as necessary.

The TSP network 20 further includes a dynamic host configuration protocol (DHCP) server 25. The DHCP server 25 is centrally administered by the TSP within the TSP network 20 to provide DHCPv6 IP addresses, used for a specified duration, corresponding to the TSP network 20. Although the DHCP server 25 is depicted as a separate element in the TSP network 20, it is understood that the DHCP server 25 may be integrated within other devices, such as the ingress edge device 22, for example. The IP addresses are allocated to the various elements within the TSP network 20, such as the ingress edge device 22 and the egress edge devices 23 and 24, as well as to the subscriber device 10.

Likewise, the exemplary service provider networks, the ISP network 40 and the corporate network 50, respectively include DHCP servers 45 and 55. As discussed above with respect to the DHCP server 25, although the DHCP servers 45 and 55 are depicted as separate network elements, it is understood that they may be integrated within other devices, such as the ISP edge device 41 and the corporate network edge device 51, respectively. The DHCP server 45 provides IP addresses corresponding to the ISP network 40, including IP addresses allocated to the edge device 41 and the subscriber device 10, and the DHCP server 55 likewise provides IP addresses corresponding to the corporate network 50, including IP addresses allocated to the edge device 51 and the subscriber device 10. In alternative embodiments, the IP addresses provided by the DHCP servers 45 and 55 may be DHCPv6 or DHCPv4 without departing from the spirit or scope of the present invention. Alternatively, the subscriber device 10 may be assigned static IP addresses corresponding to the ISP network 40 and/or the corporate network 50. The IP addresses allocated by the DHCP servers 25, 45 and 55 are stored in corresponding databases that reside on the servers.

In an embodiment of the invention, the destination network provider, such as the ISP operating the ISP network 40 or the business operating the corporate network 50, contracts with the TSP to receive IP broadband connectivity with the TSP network 20 through broadband access links 42 and 52, respectively. Of course, each destination network provider may have multiple broadband access links without departing from the spirit and the scope of the present invention. Accordingly, each of the edge devices 41 and 51 is allocated a unique IPv6 address from the TSP's IPv6 address block. The allocation is performed manually, although in an alternative embodiment, the allocation is performed by the TSP DHCP server 25.

The subscriber similarly subscribes to an IP broadband access service offered by the TSP. The subscriber device 10 is accordingly connected to the TSP network 20 through the subscriber edge device 11 and the broadband access network 12.

Figure 2:
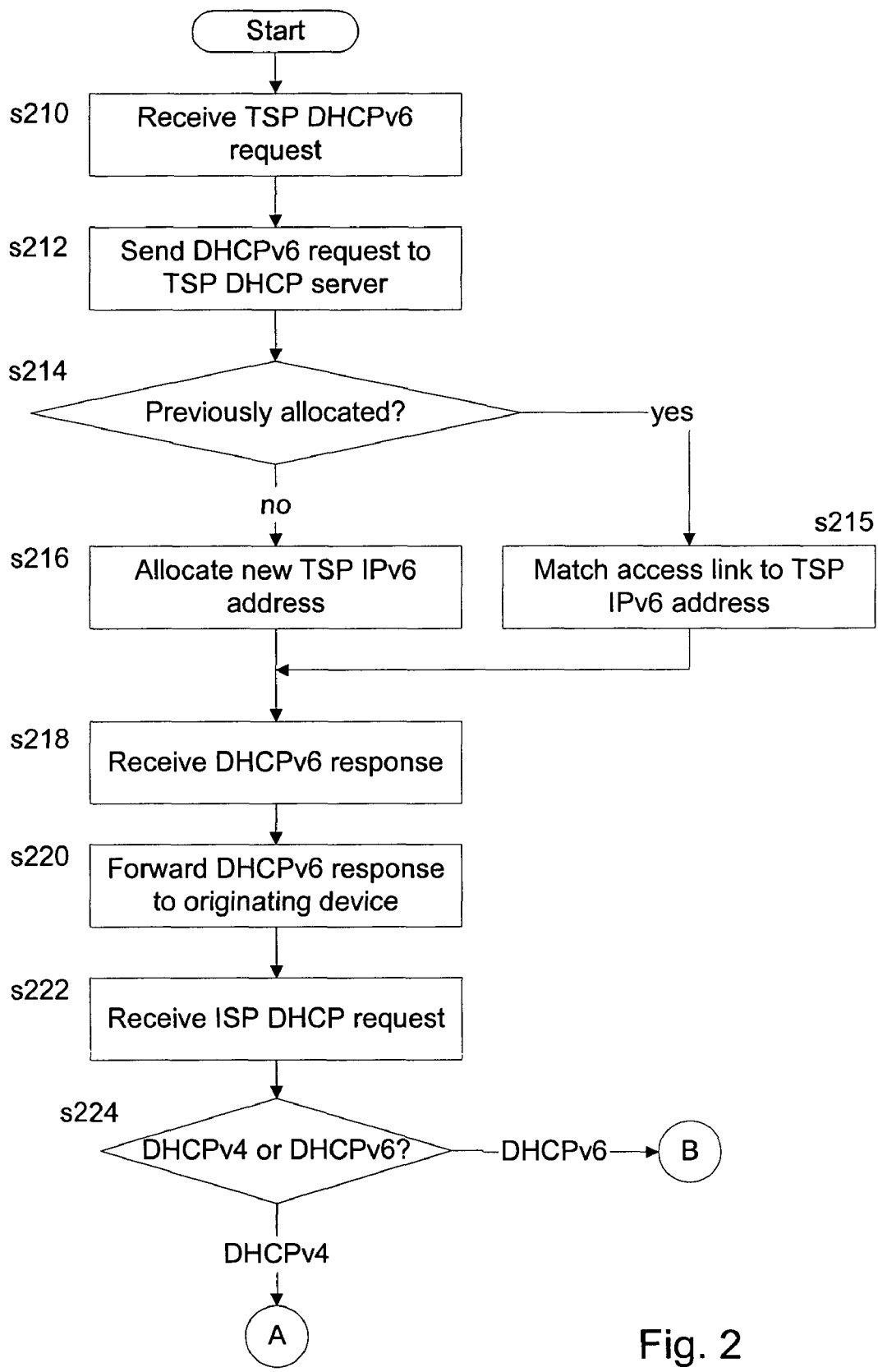
FIG. 2 is a flow diagram illustrating an exemplary initial process for bi-level addressing data packets, according to an aspect of the present invention.
Figure 3:
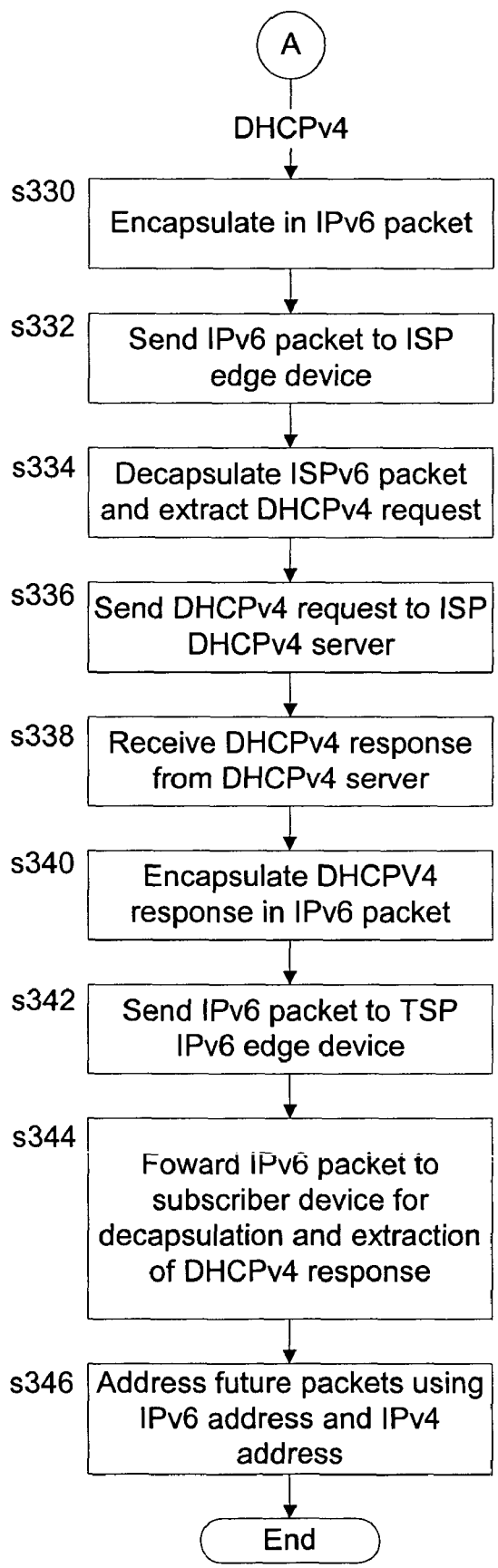
FIG. 3 is a flow diagram, continuing from FIG. 2, illustrating the exemplary process for bi-level addressing IPv4 data packets, according to an aspect of the present invention.
Figure 4:
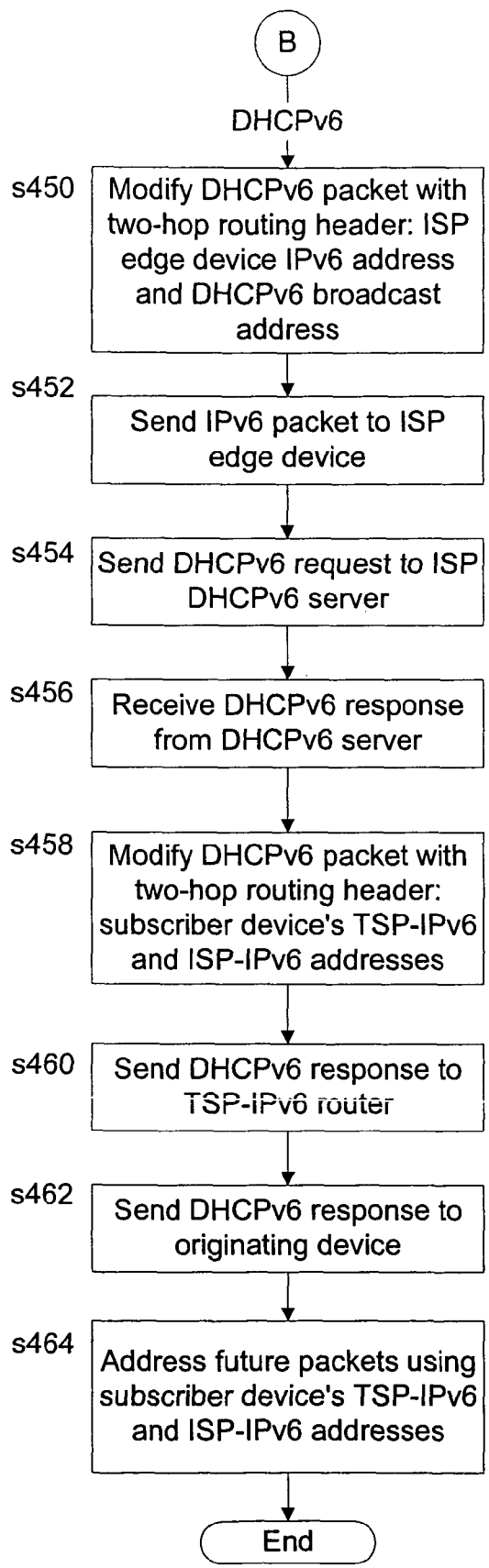
FIG. 4 is a flow diagram, continuing from FIG. 2, illustrating the exemplary process for bi-level addressing IPv6 data packets, according to an aspect of the present invention.

For purposes of describing an exemplary embodiment of the invention, it is assumed that the subscriber device 10 is attempting to access its ISP network 40 over the broadband access links 12 and 42, enabled by the TSP network 20. In accordance with the invention, the broadband TSP network 20 essentially replaces a conventional narrowband telephone network, such as the public switched telephone network (PSTN). The relationship between the subscriber device 10 and the ISP network 40, however, remains essentially the same, except that the subscriber device 10 relies on IPv6 packets in place of telephone connections through the PSTN. Also, instead of using a telephone number for the ISP network 40 assigned by the TSP, the subscriber device 10 uses an IPv6 address assigned by the TSP, in order to establish local communication between the subscriber device 10 and their ISP network 40. The subscriber device 10 still needs an IPv4 or IPv6 address from the ISP network 40 for Internet communications. FIGS. 2-4 relate to assigning both the TSP addresses and ISP addresses, according to an embodiment of the present invention.

Referring to FIG. 2, when the subscriber device 10 is initially booted up, it automatically acquires a unique IPv6 address (TSP-IPv6 address) from the TSP network 20 through stateless or stateful address autoconfiguration, respectively described, for example, in Request for Comment (RFC) 2462, "IPv6 Stateless Address Autoconfiguration" (December 1998), and RFC 2131, "Dynamic Host Configuration Protocol" (March 1997), the contents of which are expressly incorporated by reference herein in their entireties. In the depicted embodiment, the subscriber device 10 acquires its unique TSP-IPv6 address from the TSP DHCP server 25. For example, at step s210, the ingress edge device 22 receives a DHCPv6 request from the subscriber device 10 over the broadband access link 12 and forwards the request to the TSP DHCP sever 25 at step s212.

The DHCP server 25 determines whether a TSP-IPv6 address has been previously assigned to the subscriber device 10 at step s214. When a TSP-IPv6 address has been assigned, the DHCP server 25 matches the subscriber access link at step s215 by accessing a database of assigned addresses to guarantee that the subscriber device 10 consistently obtains the same TSP-IPv6 address or prefix. When a TSP-IPv6 address has not been previously assigned, the DHCP server 25 generates a new IPv6 address at step s216 unique to the subscriber device 10. Because of the large number of available IPv6 addresses, there is no need for network address translation.

At step s218, the ingress edge device 22 receives a DHCPv6 response, containing the TSP-IPv6 address, and forwards the DHCPv6 response to the subscriber device 10 over the broadband access link 12 at step s220. The subscriber device 10 extracts the IPv6 address for use in subsequent data transmissions.

At step s222, the ingress edge device 22 receives a second DHCP request broadcast from the subscriber device 10. The DHCP request is formatted either as a DHCPv4 request or a DHCPv6 request, as determined at step s224, depending on the version of IP implemented by the subscriber device 10 and/or the destination service provider network, such as the ISP network 40. The broadcast DHCP request includes a broadcast address as the destination address, which indicates that the DHCP request is to be sent to all devices in the ISP network 40 configured to respond to DHCP requests, including the DHCP server 45, for example.

When the request is a DHCPv4 request, it has been encapsulated in an IPv6 packet by the subscriber device 10 or the subscriber's interface to the TSP network, such as the modem 11. Alternatively, the ingress edge device 22 encapsulates the broadcast DHCPv4 request in an IPv6 packet, as indicated at step s330 of FIG. 3. Accordingly, the inner DHCPv4 request is addressed to the DHCP broadcast address and the outer IPv6 packet is addressed to the TSP-IPv6 address of the ISP edge device 40.

In an embodiment of the invention, the DHCPv4 packet includes authentication information (e.g., the subscriber's user name and password) and identification information (e.g., the subscriber's TSP-IPv6 address) in DHCPv4 protocol extensions. The IPv6 packet in which the DHCPv4 request is encapsulated includes as the destination address a unicast IPv6 address of the ISP edge device 41, previously allocated by the TSP. The IPv6 packet is routed through the TSP network 20 to the egress edge device 23, which forwards the IPv6 packet to the ISP edge device 41 at step s332.

The subscriber device 10 may learn the IPv6 address of the ISP edge device 41 after an initial session in order to more efficiently enable subsequent sessions. For example, in an embodiment of the invention, the subscriber enters the IPv6 address by typing it into the subscriber device 10, as done to conventionally access ISPs through dial-up modems. In another embodiment, the ISP provides the IPv6 address of the edge device 41, along with the enabling software loaded onto the subscriber device 10 when the subscriber subscribes to the ISP. In yet another embodiment, the TSP provides a directory service that enables the subscriber device 10 to look up the IPv6 address of the ISP edge device 41 based on the name, domain name, or other identifier associated with the ISP.

After the ISP edge device 41 receives the IPv6 packet, it decapsulates the IPv6 packet and extracts the DHCPv4 request at step s334. The DHCPv4 request is forwarded to the DHCP server 45 at step s336. In an embodiment of the invention, the DHCP server 45 authenticates the subscriber based on the subscriber authentication information contained, for example, in the DHCPv4 protocol extensions. After authentication, the DHCP server 45 allocates an IPv4 address from the IP address block, associated with the ISP network 40, to the subscriber device 10. The ISP-IPv4 address is included in a DHCPv4 response, which is sent to the ISP edge device 41 at step s338 and encapsulated in an IPv6 packet at step s340. The destination address of the IPv6 packet is the TSP-IPv6 already associated with the subscriber device 10, which has likewise been extracted from the DHCPv4 request and included in the DHCPv4 response.

At step s342, the IPv6 packet is sent from the ISP edge device 41 to the egress edge device 23, through the TSP network 20, to the ingress edge device 22. The ingress edge device 22 forwards the IPv6 packet to the subscriber device 10, over the broadband access link 12, at step s344. The subscriber device 10 decapsulates the IPv6 packet, extracts the DHCPv4 response and obtains the ISP-IPv4 address allocated to the subscriber device 10. Accordingly, at step s346, data from the subscriber device 10 is associated with two source IP addresses, the TSP-IPv6 address and the ISP-IPv4 address, to enable use of the IP broadband capabilities of the TSP network 20. Further, the bi-level addressing described above enables use of an IPv6 network (i.e., the TSP network 20) to transport IPv4 packets.

More particularly, when the subscriber device 10 is an IPv4 device, each of the subscriber's received and transmitted IPv4 data packets are encapsulated in an IPv6 packet. Referring to FIG. 5, the subscriber device 10 transmits an IPv4 data packet at step 510 to an edge device, such as the DSL modem 11. The source address of the IPv4 packet is the ISP-IPv4 address of the subscriber device 10 and the destination address is an ISP-IPv4 address previously assigned to a destination device 48, located in the ISP network 40, with which the subscriber device 10 is communicating. The destination device 48 may be, for example, a server.

In an embodiment of the invention, the DSL modem 11 encapsulates the IPv4 data packet in an IPv6 packet, which is forwarded to the Ingress edge device 22 at step 512. As stated above, the IPv4 packet may alternatively be encapsulated in an IPv6 packet by the subscriber device 10 or the ingress edge device 22, without departing from the spirit and scope of the present invention. The source address of the IPv6 packet (encapsulating the IPv4 packet) is the TSP-IPv6 address previously assigned to the subscriber device 10 by the TSP and the destination address is the TSP-IPv6 address previously assigned to the ISP edge device 41. The IPv6 packet is routed through the TSP network 20 to the egress edge device 23 at step 514 and to the ISP edge device 41 at step 516, based on the IPv6 packet's destination address. The ISP edge device 41 decapsulates the IPv4 packet and sends the IPv4 packet to the destination device 48 at step 518.

The reverse path (not pictured) similarly encapsulates IPv4 data packets from the ISP network 40 into IPv6 packets for transmission across the TSP network 20. More particularly, on the reverse path, the source address of the IPv6 packet encapsulating the IPv4 packet from the ISP network 40 is the TSP-IPv6 address of the ISP edge device 41 and the destination address is the TSP-IPv6 address of the subscriber device 10. The source address of the encapsulated IPv4 packet is the ISP-IPv4 address of the destination device 48, for example, and the destination address is the ISP-IPv4 address of the subscriber device 10.

In an embodiment of the invention, the ISP edge device 41 caches the mapping of the TSP-IPv6 address of the subscriber device 10 to the ISP-IPv4 address of the subscriber device 10 when the ISP edge device 41 receives the DHCPv4 response at step s338. The cache may be refreshed periodically as additional packets are transmitted from the subscriber device 10 to the ISP network 40.

Referring again to step s224 of FIG. 2, when the request is determined to be in a DHCPv6 format, the subscriber device 10 or the modem 11 modifies the DHCPv6 request that it receives from the subscriber device 10 with a two-hop extension routing header. Alternatively, the ingress edge device 22 modifies the DHCPv6 request, as shown at step s450. The two-hop extension routing header includes the TSP-IPv6 address of the ISP's edge device 41, previously allocated by the TSP, as the first hop, and the IPv6 broadcast address of the DHCPv6 request as the second hop.

Based on the first hop information, the modified DHCPv6 request is sent to the ISP edge device 41 through the TSP network 20 at step s452. The ISP edge device 41 forwards the DHCPv6 request to the DHCP server 45 at step s454 based on the IPv6 broadcast address indicated by the second hop. In an embodiment of the invention, the DHCP server 45 authenticates the subscriber based on the subscriber authentication information contained, for example, in DHCPv6 protocol extensions. After authentication, the DHCP server 45 allocates an IPv6 address from the IP address block, associated with the ISP network 40, to the subscriber device 10. The ISP-IPv6 address is included in a DHCPv6 response, which is sent to the ISP edge device 41 at step 456.

At step 458, the DHCPv6 response is likewise modified with a two-hop extension routing header, which includes the TSP-IPv6 address of the subscriber device 10, previously assigned by the TSP, as the first hop, and the newly allocated ISP-IPv6 address of the subscriber device 10 as the second hop. At step s460, the modified DHCPv6 packet is sent from the ISP edge device 41 to the egress edge device 23, through the TSP network 20, to the ingress edge device 22. The ingress edge device 22 forwards the DHCPv6 response to the subscriber device 10, over the broadband access link 12, at step s462. The subscriber device 10 obtains the allocated ISP-IPv6 address included in the second hop of the DHCPv6 response. Accordingly, at step s464, data from the subscriber device 10 is associated with tow IP addresses, the TSP-IPv6 address and the ISP-IPv6 address, to enable use of the IP broadband capabilities of the TSP network 20, as well as the ISP network 40.

Accordingly, when the subscriber device 10 is an IPv6 device, each of the subscriber's receiving and transmitting IPv6 data packets has a two-hop IPv6 routing header added, for example, by the IPv6 protocol stack of the subscriber device 10. The IPv6 routing header is implemented, for example, in accordance with RFC 2460, "Internet Protocol, Version 6 (IPv6) Specification" (December 1998), the content of which is expressly incorporated by reference herein in its entirety.

Referring to FIG. 5, when the subscriber device 10 transmits an IPv6 data packet, the first hop (i.e., the additional hop) is the TSP-IPv6 address previously assigned to the ISP edge device 41, and the second hop is the IP address of the packet's destination accessed through the ISP network 40. The IPv6 packet is transmitted to the DSL modem 11 at step 510 and to the ingress edge device 22 at step 512. Based on the first hop address, the IPv6 packet is routed through the TSP network 20 to the egress edge device 23 at step 514 and to the ISP edge device 41 at step 516. The ISP edge device 41 sends the IPv6 packet to the destination device 48, for example, based on the second hop address at step 518.

The reverse path (not pictured) similarly modifies a return IPv6 data packet from the destination device 48 with a two-hop extension routing header. More particularly, on the reverse path, the first hop (i.e., the additional hop) is the TSP-IPv6 address of the subscriber device 10, and the second hop is the newly assigned ISP-IPv6 address of subscriber device 10.

In an embodiment of the invention, the ISP edge device 41 caches the mapping of the TSP-IPv6 address of the subscriber device 10 to the ISP-IPv6 address of the subscriber device 10 when the ISP edge device 41 receives the DHCPv6 response at step s456. The cache may be refreshed periodically as additional packets are transmitted from the subscriber device 10 to the ISP network 40.

The present invention offers a number of advantages over the existing network access technologies. For example, due to the enormous address space and support for address autoconfiguration inherent to IPv6, address management is relatively simple. Also, a single, uniform, scalable IPv6 network replaces the need to separately establish connections between subscribers and their respective ISP networks (or other remote IP networks).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., IPv6, IPv4, TCP/IP, UDP/IP) and public telephone networks (ATM, DSL) represent examples of the state of the art. Such standards are periodically superseded by faster or more efficient equivalents having essentially the same functions. Accordingly, replacement standards and protocols having the same functions are considered equivalents.

What is claimed:

1. A method for routing data packets from a subscriber device, over a broadband access link, through a first internet protocol (IP) version 6 (IPv6) network to a second IP network, the first and second IP networks interfacing through a second IP network edge device, the method comprising:
   assigning a first IP address to the subscriber device, the first IP address being associated with the first IP network;
   assigning a second IP address to the subscriber device based on a request routed through the first IP network from the subscriber device, the second IP address being associated with the second IP network;
   forwarding a data packet addressed with both the first IP address and the second IP address, from the subscriber device, without using network address translation and without mapping the first IP address to the second IP address,
   wherein the first IP address is compliant with a first protocol implemented by the first IP network, and
   wherein the second IP address is compliant with a second protocol distinct from the first protocol implemented by the second IP network.

2. The method for routing data packets according to claim 1,
   wherein the request comprises a dynamic host configuration protocol (DHCP) request.

3. The method for routing data packets according to claim 2,
   wherein the subscriber device comprises an IP version 4 (IPv4) device, the method further comprising:
   encapsulating the DHCP request in an IPv6 packet for routing the DHCP request through the first IP network.

4. The method for routing data packets according to claim 2,
   wherein the subscriber device comprises an IPv6 device, the method further comprising:
   modifying the DHCP request to include a two-hop IPv6 routing header for routing the DHCP request through the first IP network.

5. The method for routing data packets according to claim 4,
   wherein the two-hop IPv6 routing header comprises an IP address of the second IP network edge device as a first hop address and an IP broadcast address of the DHCP request as a second hop address, and
   wherein the IP address of the second IP network edge device is associated with the first IP network.

6. The method for routing data packets according to claim 5,
   wherein providing the second IP address to the subscriber device is further based on a DHCP response routed through the first IP network from the edge device to the subscriber device, the method further comprising:
   modifying the DHCP response to include a two-hop IPv6 routing header for routing the DHCP response through the first IP network to the subscriber device.

7. The method for routing data packets according to claim 6,
   wherein the two-hop IPv6 routing header of the DHCP response comprises the first IP address of the subscriber device as a first hop address and the second IP address of the subscriber devices as a second hop address.

8. A method for forwarding data packets of a subscriber for transmission from an originating device over a broadband access link through an interne protocol (IP) network to a destination network, the method comprising:
   allocating a first subscriber IP address to the originating device, the first subscriber IP address being associated with the IP network;
   receiving a dynamic host configuration protocol (DHCP) request from the originating device, the DHCP request being associated with the first subscriber IP address;
   sending the DHCP request through the IP network to a destination device in the destination network using an IP network address of the destination device, the destination device forwarding the DHCP request to a DHCP server;
   receiving a DHCP response from the DHCP server, through the destination device, the DHCP response including a second subscriber IP address from the DHCP server, the second subscriber IP address being associated with the destination network; and
   sending the DHCP response through the IP network to the originating device using the first subscriber IP address, enabling the originating device to obtain the second subscriber IP address from the DHCP response and forward subsequent data packets addressed with both the first subscriber IP address and the second subscriber IP address without using network address translation and without mapping the first subscriber IP address to the second subscriber IP address.

9. The method for forwarding data packets according to claim 8,
   wherein the IP network comprises an IP version 6 (IPv6) network, and
   wherein the first subscriber IP address and the IP network address of the destination device comprise IPv6 addresses.

10. The method for forwarding data packets according to claim 9,
    wherein the originating device comprises an IP-version 4 (IPv4) device, the DHCP request comprises a DHCPv4 request, the DHCP response comprises a DHCPv4 response and the second subscriber IP address comprises an IPv4 address.

11. The method for forwarding data packets according to claim 10,
    wherein sending the DHCP request through the IP network comprises:
    encapsulating the DHCPv4 request in a first IPv6 packet, using the IPv6 network address of the destination device as a first destination address, and sending the first IPv6 packet to the destination device using the first destination address,
    wherein the destination device extracts the DHCPv4 request from the first IPv6 packet prior to forwarding the DHCPv4 request to the DHCP server.

12. The method for forwarding data packets according to claim 11,
    wherein sending the DHCP response through the IP network comprises:
    encapsulating the DHCPv4 response in a second IPv6 packet, using the first subscriber IPv6 address as a second destination address, and sending the second IPv6 packet to the originating device using the second destination address,
    wherein the originating device extracts the DHCPv4 response from the second IPv6 packet to obtain the second subscriber IPv4 address.

13. The method for forwarding data packets according to claim 9,
    wherein the originating device comprises an IPv6 device, the DHCP request comprises a DHCPv6 request, the DHCP response comprises a DHCPv6 response and the second subscriber IP address comprises an IPv6 address.

14. The method for forwarding data packets according to claim 13,
    wherein sending the DHCP request through the IP network comprises:
    modifying the DHCPv6 request to include a two-hop IPv6 routing header comprising the IPv6 network address of the destination device as a first hop address and an IPv6 broadcast address of the DHCPv6 request as the second hop address, and sending the DHCPv6 request to the destination device using the first hop address.

15. The method for forwarding data packets according to claim 14,
    wherein sending the DHCP response through the IP network comprises:
    modifying the DHCPv6 response to include a two-hop IPv6 routing header comprising the first subscriber IPv6 address as a first hop address and the second subscriber IPv6 address of the DHCPv6 request as the second hop address, and sending the DHCPv6 response to the destination device using the first hop address.

16. The method for forwarding data packets according to claim 8,
    wherein allocating the first subscriber IP address comprises matching a previously allocated network IPv6 address of the subscriber.

17. The method for forwarding data packets according to claim 8,
    wherein allocating the first subscriber IP address comprises receiving an initial DHCP request at a DHCP server associated with the IP network, and sending an initial DHCP response to the originating device from the IP network DHCP server, the initial DHCP response including the first subscriber IP address.

18. A system for forwarding data packets of a subscriber for transmission over a broadband access link from an originating device through a first internet protocol (IP) network to a second IP network, the first IP network and the second IP network interfacing through at least one edge device of the second IP network, the system comprising:
    a first dynamic host configuration protocol (DHCP) server in the first IP network that allocates a first subscriber IP address to the originating device, the first subscriber IP address being associated with the first IP network; and
    a second DHCP server in the second IP network that receives a DHCP request from the originating device through the at least one edge device, allocates a second subscriber IP address to the originating device, and sends a DHCP response having the second subscriber IP address through the at least one edge device to the originating device, the second subscriber IP address being associated with the second IP network,
    wherein the originating device forwards data packets with both the first subscriber IP address and the second subscriber IP address without using network address translation and without mapping the first subscriber IP address to the second subscriber IP address.

19. The system for forwarding data packets according to claim 18,
    wherein the first IP network comprises an IP-version 6 (IPv6) network and the first subscriber IP address comprises an IPv6 address.

20. The system for forwarding data packets according to claim 19,
    wherein the originating device comprises an IP-version 4 (IPv4) device, the second DHCP server comprises a DHCPv4 server, the DHCP request comprises a DHCPv4 request, the DHCP response comprises a DHCPv4 response and the second subscriber IP address comprises an IPv4 address.

21. The system for forwarding data packets according to claim 20,
    wherein the DHCP request from the origination device is encapsulated in a first IPv6 packet received by the at least one edge device based on an IPv6 address of the at least one edge device included in the first IPv6 packet, and
    wherein the at least one edge device extracts the DHCP request from the first IPv6 packet prior to forwarding the DHCP request to the second DHCP server.

22. The system for forwarding data packets according to claim 21,
    wherein the DHCP response from the second DHCP server is encapsulated in a second IPv6 packet, received by the originating device based on the first subscriber IP address included in the second IPv6 packet, the originating device extracting the DHCP response from the second IPv6 packet to obtain the second subscriber IP address.

23. The system for forwarding data packets according to claim 19,
wherein the originating device comprises an IPv6 device, the second DHCP server comprises a DHCPv6 server, the DHCP request comprises a DHCPv6 request, the DHCP response comprises a DHCPv6 response and the second subscriber IP address comprises an IPv6 address.

24. The system for forwarding data packets according to claim 23,
wherein the DHCPv6 request from the origination device is modified to include a two-hop IPv6 routing header, comprising an IPv6 network address of the at least one edge device as a first hop address and an IPv6 broadcast address of the DHCPv6 request as a second hop address, the at least one edge device receiving the DHCPv6 request based on the first hop address.

25. The system for forwarding data packets according to claim 24,
wherein the DHCPv6 response from the second DHCP server is modified to include a two-hop IPv6 routing header, comprising the first subscriber IPv6 address as a first hop address and the second subscriber IPv6 address as a second hop address, the at least one edge device directing the DHCPv6 response to the originating device using the first hop address.

26. The system for forwarding data packets according to claim 18,
wherein the second IP network comprises one of an interne service provider network and a private network.

* * * * *